United States Patent
Nuñez et al.

(10) Patent No.: US 11,022,722 B2
(45) Date of Patent: Jun. 1, 2021

(54) WATER EXTRACTABLE OPHTHALMIC DEVICES

(71) Applicant: Bausch & Lomb Incorporated, Rochester, NY (US)

(72) Inventors: Ivan M. Nuñez, Penfield, NY (US); Katie L. Poetz, Webster, NY (US); Lynn Coullard, Williamson, NY (US); Alok Kumar Awasthi, Pittsford, NY (US); Analuz Mark, Spencerport, NY (US); Joseph W. Hoff, Fairport, NY (US); Andrew J. Hoteling, Ontario, NY (US)

(73) Assignee: Bausch & Lomb Incorporated, Rochester, NY (US)

(*) Notice: Subject to any disclaimer, the term of this patent is extended or adjusted under 35 U.S.C. 154(b) by 178 days.

(21) Appl. No.: 16/415,281

(22) Filed: May 17, 2019

(65) Prior Publication Data

US 2020/0012015 A1     Jan. 9, 2020

Related U.S. Application Data

(60) Provisional application No. 62/693,746, filed on Jul. 3, 2018.

(51) Int. Cl.
| | |
|---|---|
| *G02B 1/04* | (2006.01) |
| *C08L 83/04* | (2006.01) |
| *C08K 5/34* | (2006.01) |
| *C08L 33/10* | (2006.01) |
| *C08K 5/3412* | (2006.01) |

(52) U.S. Cl.
CPC .............. *G02B 1/043* (2013.01); *C08L 83/04* (2013.01); *C08K 5/3412* (2013.01); *C08L 33/10* (2013.01)

(58) Field of Classification Search
None
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 4,113,224 A | 9/1978 | Clark et al. |
| 4,195,030 A | 3/1980 | Deichert et al. |
| 4,197,266 A | 4/1980 | Clark et al. |
| 4,208,506 A | 6/1980 | Deichert et al. |
| 4,327,203 A | 4/1982 | Deichert et al. |
| 4,355,147 A | 10/1982 | Deichert et al. |
| 4,555,732 A | 11/1985 | Tuhro |
| 4,910,277 A | 3/1990 | Bambury et al. |
| 5,070,215 A | 12/1991 | Bambury et al. |
| 5,271,875 A | 12/1993 | Appleton et al. |
| 6,020,445 A | 2/2000 | Vanderlaan et al. |
| 7,915,323 B2 | 3/2011 | Awasthi et al. |
| 8,967,799 B2 | 3/2015 | Nunez et al. |
| 10,676,575 B2* | 6/2020 | Zhang ................... C08F 287/00 |
| 2011/0009519 A1 | 1/2011 | Awasthi et al. |
| 2013/0289294 A1 | 10/2013 | Awasthi et al. |
| 2014/0179824 A1 | 6/2014 | Nunez et al. |
| 2014/0296368 A1* | 10/2014 | Tamiya ................. C08G 77/452 523/107 |

FOREIGN PATENT DOCUMENTS

WO  PCT/US2019/032819     8/2019

\* cited by examiner

*Primary Examiner* — Tae H Yoon
(74) *Attorney, Agent, or Firm* — Ryan, Mason & Lewis, LLP

(57) ABSTRACT

A water extractable ophthalmic device is disclosed which is a polymerization product of a monomeric mixture comprising: (a) one or more cyclic lactams; (b) one or more organosilicon-containing block copolymers; (c) one or more bulky siloxane monomers; and (d) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group. The water extractable ophthalmic device has an equilibrium water content of at least about 50 wt. %, a contact angle of less than about 50°, and an oxygen permeability of at least about 60 Barrers.

50 Claims, No Drawings

WATER EXTRACTABLE OPHTHALMIC DEVICES

RELATED APPLICATIONS

The present application claims priority to U.S. Provisional Patent Application Ser. No. 62/693,746, filed Jul. 3, 2018, and entitled "WATER EXTRACTIBLE OPHTHALMIC DEVICES," which is incorporated by reference herein in its entirety.

BACKGROUND

The present invention generally relates to water extractable ophthalmic devices and methods for their preparation.

Soft contact lenses have been available since the 1980s. It is important that contact lenses be comfortable and safe to wear. A hydrogel is a hydrated cross-linked polymeric system that contains water in an equilibrium state. Hydrogels typically are oxygen permeable and biocompatible, making them a preferred material for producing biomedical devices and in particular contact or intraocular lenses.

Soft contact lens materials are made by polymerizing and crosslinking hydrophilic monomers such as 2-hydroxyethyl methacrylate (HEMA) or N-vinyl pyrrolidone (NVP). The polymers produced by polymerizing these hydrophilic monomers exhibit significant hydrophilic character themselves and are capable of absorbing a significant amount of water in their polymeric matrices. Due to their ability to absorb water, these polymers are often referred to as "hydrogels". These hydrogels are optically clear and, due to their high levels of water of hydration, are useful materials for making soft contact lenses. However, these hydrogels are known to have poor levels of oxygen permeability.

Thus, there has been a shift towards the introduction of silicone-containing monomers to increase the oxygen permeability. Silicone-containing polymers generally have higher oxygen permeabilities than conventional hydrogels. Siloxane-type monomers are well known to be poorly soluble in water as well as hydrophilic solvents and monomers and are therefore difficult to copolymerize and process using standard hydrogel techniques.

Thus, there remains a need for an ophthalmic device which is made with silicone-containing monomers that is extractable in water instead of the organic solvents.

SUMMARY

In accordance with one embodiment of the present invention, a water extractable ophthalmic device is provided which is a polymerization product of a monomeric mixture comprising: (a) one or more cyclic lactams; (b) one or more organosilicon-containing block copolymers comprising one or more siloxanyl units and one or more silyl-alkyl-siloxanyl units, wherein the one or more organosilicon-containing block copolymers have an ethylenically unsaturated reactive end group; (c) one or more bulky siloxane monomers containing an ethylenically unsaturated reactive end group; and (d) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group, wherein the water extractable ophthalmic device has an equilibrium water content of at least about 50 wt. %, a contact angle of less than about 50°, and an oxygen permeability of at least about 60 Barrers.

In accordance with a second embodiment of the present invention, a method for making a water extractable ophthalmic device is provided which comprises (a) curing a monomeric mixture in a mold, the monomeric mixture comprising (i) one or more cyclic lactams; (ii) one or more organosilicon-containing block copolymers comprising one or more siloxanyl units and one or more silyl-alkyl-siloxanyl units, wherein the one or more organosilicon-containing block copolymers have an ethylenically unsaturated reactive end group; (iii) one or more bulky siloxane monomers; and (iv) a crosslinking agent mixture comprising (1) one or more first crosslinking agents containing at least two ethylenically unsaturated reactive end groups, wherein the at least two ethylenically unsaturated reactive end groups are (meth)acrylate-containing reactive end groups and (2) one or more second crosslinking agents containing at least two ethylenically unsaturated reactive end groups wherein at least one of the ethylenically unsaturated reactive end groups is a non-(meth)acrylate reactive end group; and (b) dry releasing the ophthalmic device from the mold to provide a water extractable ophthalmic device having an equilibrium water content of at least about 50 wt. %, a contact angle of less than about 30°, and an oxygen permeability of at least about 60 Barrers.

The water extractable ophthalmic device of the present invention is believed to provide a higher level of performance quality and/or comfort to the users due to their hydrophilic or lubricious (or both) surfaces. Hydrophilic and/or lubricious surfaces of the ophthalmic devices herein such as contact lenses substantially prevent or limit the adsorption of tear lipids and proteins on, and their eventual absorption into, the lenses, thus preserving the clarity of the contact lenses. This, in turn, preserves their performance quality thereby providing a higher level of comfort to the wearer.

DETAILED DESCRIPTION

The illustrative embodiments described herein are directed to water extractable ophthalmic devices. Although the illustrative embodiments are applicable to a variety of water extractable ophthalmic devices, one particular illustrative embodiment is especially useful and advantageous for water extractable contact lenses. As used herein, the terms "ophthalmic device" and "lens" refer to devices that reside in or on the eye. These devices can provide optical correction, wound care, drug delivery, diagnostic functionality, cosmetic enhancement or any combination of these properties. Representative examples of such devices include, but are not limited to, soft contact lenses, e.g., soft, hydrogel lenses, soft, non-hydrogel lenses and the like, intraocular lenses, overlay lenses, ocular inserts, optical inserts, bandage lenses and therapeutic lenses and the like. As is understood by one skilled in the art, a lens is considered to be "soft" if it can be folded back upon itself without breaking. The high water content ophthalmic devices such as high water content contact lenses of the illustrative embodiments can be spherical, toric, bifocal, may contain cosmetic tints, opaque cosmetic patterns, combinations thereof and the like.

In general, the water extractable ophthalmic device is a polymerization product of a monomeric mixture comprising: (a) one or more cyclic lactams; (b) one or more organosilicon-containing block copolymers comprising one or more siloxanyl units and one or more silyl-alkyl-siloxanyl units, wherein the one or more organosilicon-containing block copolymers have an ethylenically unsaturated reactive end group; (c) one or more bulky siloxane monomers; and (d) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group, wherein the water extractable ophthalmic device has an equilibrium water content of at least about 50 wt. %, a contact angle of less than about 30°, and an oxygen permeability of at least about 60 Barrers.

In one illustrative embodiment, a water extractable ophthalmic device according to the present invention has an equilibrium water content of from about 50 wt. % to about 70 wt. %, a contact angle of from about 30° to about 50°, and an oxygen permeability of at least about 60 Barrers, e.g., from 60 to about 100 Barrers. In another illustrative embodiment, a water extractable ophthalmic device according to the present invention has an equilibrium water content of from about 55 wt. % to about 65 wt. %, a contact angle of from about 30° to about 45°, and an oxygen permeability of at least about 70 Barrers, e.g., from 70 to about 100 Barrers.

The monomeric mixture includes one or more cyclic lactams. Suitable one or more cyclic lactams include, for example, N-vinyl-2-pyrrolidone, N-vinyl caprolactam, N-vinyl-2-piperidone and mixtures thereof. The one or more cyclic lactams are present in the monomeric mixture in an amount of no more than about 55 wt. %, based on the total weight of the monomeric mixture. In one embodiment, the one or more cyclic lactams are present in the monomeric mixture in an amount of from about 40 wt. % to about 55 wt. %, based on the total weight of the monomeric mixture.

The monomeric mixture further includes one or more organosilicon-containing block copolymers comprising one or more siloxanyl units and one or more silyl-alkyl-siloxanyl units, wherein the one or more organosilicon-containing block copolymers have an ethylenically unsaturated reactive end group. Methods for preparing the one or more organosilicon-containing block copolymers are within the purview of one skilled in the art and are also shown in the examples. In general, the one or more organosilicon-containing block copolymers will contain from about 3 to about 27 units of the one or more siloxanyl units and from about 1 to about 10 units of the one or more silyl-alkyl-siloxanyl units. In one embodiment, the one or more organosilicon-containing block copolymers will contain from about 3 to about 15 units of the one or more siloxanyl units and from about 1 to about 8 units of the one or more silyl-alkyl-siloxanyl units. The alkyl group of the silyl-alkyl-siloxanyl unit can be an alkyl group having from 2 to about 4 carbon atoms or about 2 carbon atoms.

Ethylenically unsaturated reactive end groups are well known to those skilled in the art. Suitable ethylenically unsaturated polymerizable groups include, for example, (meth)acrylates, vinyl carbonates, O-vinyl carbamates, N-vinyl carbamates, and (meth)acrylamides. As used herein, the term "(meth)" denotes an optional methyl substituent. Thus, terms such as "(meth)acrylate" denotes either methacrylate or acrylate, and "(meth)acrylamide" denotes either methacrylamide or acrylamide.

In one embodiment, the one or more organosilicon-containing block copolymers can have a number average molecular weight ranging from about 650 Da to about 2,590 Da. In one embodiment, the one or more organosilicon-containing block copolymers can have a number average molecular weight ranging from about 870 Da to about 2,810 Da.

In one embodiment, the one or more organosilicon-containing block copolymers can be represented by a structure of Formula I:

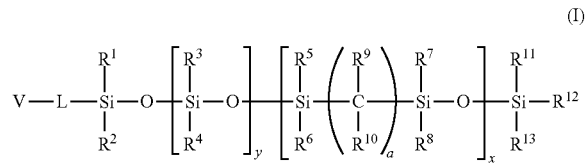

wherein V is an ethylenically unsaturated reactive end group, L is a linker group or a bond; $R^1$, $R^2$, $R^3$, $R^4$, $R^5$, $R^6$, $R^7$, and $R^8$ are independently hydrogen, $C_1$ to $C_{12}$ alkyl, halo alkyl, $C_3$ to $C_{12}$ cycloalkyl, heterocycloalkyl, $C_2$ to $C_{12}$ alkenyl, haloalkenyl, or $C_6$ to $C_{12}$ aromatic; $R^9$ and $R^{10}$ are independently hydrogen or $C_1$ to $C_{12}$ alkyl; $R^{11}$, $R^{12}$ and $R^{13}$ are independently a $C_1$ to $C_{12}$ alkyl, y is from 3 to 27, x is from 1 to 10 and a is from 2 to 4.

The ethylenically unsaturated reactive end groups can be any of those discussed above. Linker groups can be any divalent radical or moiety and include, for example, substituted or unsubstituted $C_1$ to $C_{12}$ alkyl, alkyl ether, alkenyls, alkenyl ethers, halo alkyls, substituted or unsubstituted siloxanes, and monomers capable of propagating ring opening.

In one embodiment, V is a (meth)acrylate, L is a $C_1$ to $C_{12}$ alkylene, $R^1$, $R^2$, $R^3$, $R^4$, $R^5$, $R^6$, $R^7$, and $R^8$ are independently a $C_1$ to $C_{12}$ alkyl, $R^9$ and $R^{10}$ are hydrogen, $R^{11}$, $R^{12}$ and $R^{13}$ are independently a $C_1$ to $C_{12}$ alkyl, y is from 3 to 15, x is from 1 to 8 and a is 2.

In one embodiment, V is a (meth)acrylate, L is a $C_1$ to $C_6$ alkylene, $R^1$, $R^2$, $R^3$, $R^4$, $R^5$, $R^6$, $R^7$, and $R^8$ are independently a $C_1$ to $C_6$ alkyl, $R^9$ and $R^{10}$ are hydrogen, $R^{11}$, $R^{12}$ and $R^{13}$ are independently a $C_1$ to $C_3$ alkyl, y is from 6 to 18, x is from 1 to 8, and a is 2.

In one embodiment, the one or more organosilicon-containing block copolymers can be represented by a structure of Formula II:

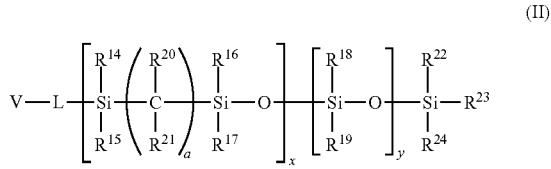

wherein V is an ethylenically unsaturated reactive end group, L is a linker group or a bond; $R^{14}$, $R^{15}$, $R^{16}$, $R^{17}$, $R^{18}$, and $R^{19}$ are independently hydrogen, $C_1$ to $C_{12}$ alkyl, halo alkyl, $C_3$ to $C_{12}$ cycloalkyl, heterocycloalkyl, $C_2$ to $C_{12}$ alkenyl, haloalkenyl, or $C_6$ to $C_{12}$ aromatic; $R^{20}$ and $R^{21}$ are independently hydrogen or $C_1$ to $C_{12}$ alkyl; $R^{22}$, $R^{23}$ and $R^{24}$ are independently a $C_1$ to $C_{12}$ alkyl, y is from 3 to 27, x is from 1 to 10 and a is from 2 to 4. The ethylenically unsaturated reactive end groups and linker groups can be any of those discussed above.

In one embodiment, V is a (meth)acrylate, L is a $C_1$ to $C_{12}$ alkylene, $R^{14}$, $R^{15}$, $R^{16}$, $R^{17}$, $R^{18}$, and $R^{19}$ are independently a $C_1$ to $C_{12}$ alkyl, $R^{20}$ and $R^{21}$ are hydrogen, $R^{22}$, $R^{23}$ and $R^{24}$ are independently a $C_1$ to $C_{12}$ alkyl, y is from 3 to 18, x is from 1 to 3, and a is 2.

In one embodiment, V is a (meth)acrylate, L is a $C_1$ to $C_6$ alkylene, $R^{14}$, $R^{15}$, $R^{16}$, $R^{17}$, $R^{18}$, and $R^{19}$ are independently a $C_1$ to $C_6$ alkyl, $R^{20}$ and $R^{21}$ are hydrogen, $R^{22}$, $R^{23}$ and $R^{24}$ are independently a $C_1$ to $C_3$ alkyl, y is from 6 to 18, x is from 1 to 8 and a is 2.

In general, the one or more organosilicon-containing block copolymers can be present in the monomeric mixture in an amount ranging from about 5 wt. % to about 35 wt. %, based on the total weight of the monomeric mixture. In one embodiment, the one or more organosilicon-containing block copolymers can be present in the monomeric mixture in an amount ranging from about 15 wt. % to about 25 wt. %, based on the total weight of the monomeric mixture.

The monomeric mixture further includes one or more bulky siloxane monomers. In one embodiment, a suitable bulky siloxane monomer is represented by the structure of Formula III:

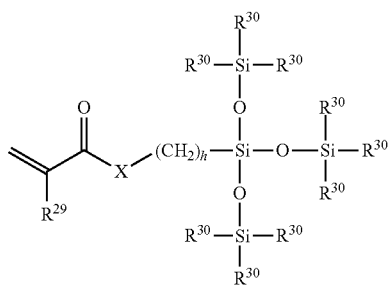

(III)

wherein X denotes —COO—, —CONR″—, —OCOO—, or —OCONR″— where each R″ is hydrogen or a $C_1$-$C_4$ alkyl; $R^{29}$ independently denotes hydrogen or methyl; each $R^{30}$ independently denotes a lower alkyl radical such as a $C_1$-$C_6$ alkyl, a phenyl radical or a group represented by

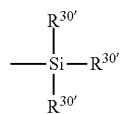

wherein each $R^{30'}$ independently denotes a lower alkyl such as a $C_1$-$C_6$ alkyl, or phenyl radical; and h is 1 to 10.

In one embodiment, a suitable bulky siloxane monomer is a bulky polysiloxanylalkyl carbamate monomers as generally depicted in Formula IV:

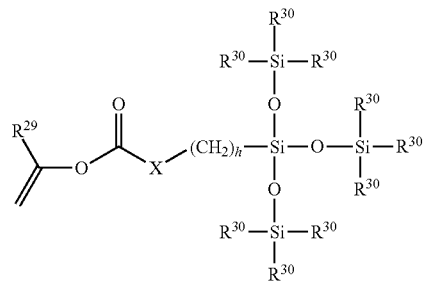

(IV)

wherein X denotes —NR″—; wherein R″ denotes hydrogen or a $C_1$-$C_4$ alkyl; $R^{29}$ denotes hydrogen or methyl; each $R^{30}$ independently denotes a lower alkyl radical such as a $C_1$-$C_6$ alkyl, a phenyl radical or a group represented by

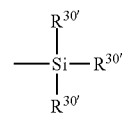

wherein each $R^{30'}$ independently denotes a lower alkyl such as a $C_1$-$C_6$ alkyl, or a phenyl radical; and h is 1 to 10.

Suitable one or more bulky siloxane monomers include, for example, methacryloxypropyl tris(trimethylsiloxy)silane ("TRIS"), pentamethyldisiloxanyl methylmethacrylate, tris(trimethylsiloxy)methacryloxy propylsilane, phenyltretramethyl-disloxanylethyl acrylate, methyldi(trimethylsiloxy)methacryloxymethyl silane, 3-[tris(trimethylsiloxy)silyl] propyl vinyl carbamate, 3-[tris(trimethylsiloxy)silyl] propyol allyl carbamate, 3-[tris(trimethylsiloxy)silyl]propyl vinyl carbonate and mixtures thereof.

In general, the one or more bulky siloxane monomers can be present in the monomeric mixture in an amount ranging from about 12 wt. % to about 30 wt. %, based on the total weight of the monomeric mixture. In one embodiment, the one or more bulky siloxane monomers can be present in the monomeric mixture in an amount ranging from about 15 wt. % to about 26 wt. %, based on the total weight of the monomeric mixture.

The monomeric mixture further includes a crosslinking agent mixture comprising (i) one or more first crosslinking agents containing at least two ethylenically unsaturated reactive end groups, wherein the ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group. In one illustrative embodiment, useful one or more first crosslinking agents containing at least two ethylenically unsaturated reactive end groups, wherein the ethylenically unsaturated reactive end groups are (meth)acrylate-containing reactive end groups include, for example, one or more di-, tri- or tetra(meth)acrylate-containing crosslinking agents.

In one illustrative embodiment, useful one or more di-, tri- or tetra(meth)acrylate-containing crosslinking agents include alkanepolyol di-, tri- or tetra(meth)acrylate-containing crosslinking agents such as, for example, one or more alkylene glycol di(meth)acrylate crosslinking agents, one or more alkylene glycol tri(meth)acrylate crosslinking agents, one or more alkylene glycol tetra(meth)acrylate crosslinking agents, one or more alkanediol di(meth)acrylate crosslinking agents, alkanediol tri(meth)acrylate crosslinking agents, alkanediol tetra(meth)acrylate crosslinking agents, agents, one or more alkanetriol di(meth)acrylate crosslinking agents, alkanetriol tri(meth)acrylate crosslinking agents, alkanetriol tetra(meth)acrylate crosslinking agents, agents, one or more alkanetetraol di(meth)acrylate crosslinking agents, alkanetetraol tri(meth)acrylate crosslinking agents, alkanetetraol tetra(meth)acrylate crosslinking agents and the like and mixtures thereof.

In one embodiment, one or more alkylene glycol di(meth)acrylate crosslinking agents include tetraethylene glycol dimethacrylate, ethylene glycol di(meth)acrylates having up to about 10 ethylene glycol repeating units, butyleneglycol di(meth)acrylate and the like. In one embodiment, one or more alkanediol di(meth)acrylate crosslinking agents include butanediol di(meth)acrylate crosslinking agents, hexanediol di(meth)acrylate and the like. In one embodiment, one or more alkanetriol tri(meth)acrylate crosslinking agents are trimethylol propane trimethacrylate crosslinking agents. In one embodiment, one or more alkanetetraol tetra(meth)acrylate crosslinking agents are pentaerythritol tetramethacrylate crosslinking agents.

In one illustrative embodiment, useful one or more second crosslinking agents containing at least two ethylenically unsaturated reactive end groups wherein at least one of the ethylenically unsaturated reactive end groups is a non-(meth)acrylate reactive end group include one or more di-, tri- or tetracarbamate-containing crosslinking agents, one or more di-, tri- or tetracarbonate-containing crosslinking agents, one or more isocyanurate-containing crosslinking agents and the like and mixtures thereof.

Representative examples of one or more di-, tri- or tetracarbamate-containing crosslinking agents include one or more di(N-vinylcarbamate)-containing crosslinking agents, one or more di(N-allylcarbamate)-containing crosslinking agents, one or more di(O-vinylcarbamate)-containing crosslinking agents, one or more di(O-allylcarbamate)-containing crosslinking agents, one or more tri(N-vinylcarbamate)-containing crosslinking agents, one or more tri(N-allylcarbamate)-containing crosslinking agents, one or more tri(O-vinylcarbamate)-containing crosslinking agents, one or more tri(O-allylcarbamate)-containing crosslinking agents, one or more tetra(N-vinylcarbamate)-containing crosslinking agents, one or more tetra (N-allylcarbamate)-containing crosslinking agents, one or more tetra (O-vinylcarbamate)-containing crosslinking agents, one or more tetra(O-allylcarbamate)-containing crosslinking agents, and the like and mixtures thereof.

Representative examples of one or more di-, tri- or tetracarbonate-containing crosslinking agents include a di(O-vinylcarbonate)-containing crosslinking agent, a di(O-allylcarbonate)-containing crosslinking agent, a tri(O-vinylcarbonate)-containing crosslinking agent, a tri(O-allylcarbonate)-containing crosslinking agent, a tetra(O-vinylcarbonate)-containing crosslinking agent, a tetra(O-allylcarbonate)-containing crosslinking agent, and the like and mixtures thereof.

Representative examples of one or more isocyanurate-containing crosslinking agents include one or more diallyl isocyanurate, triallyl isocyanurate, divinyl isocyanurate, trivinyl isocyanurate, and the like and mixtures thereof.

In one embodiment, the one or more di-carbamate-containing crosslinking agents include bis (N-vinyl carbamates) having the following structure:

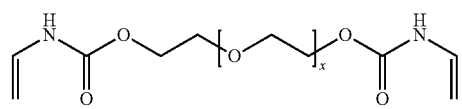

wherein x is from 0 to 10.

In one embodiment, the one or more di-carbamate-containing crosslinking agents include bis (O-vinyl carbamates) having the following structure:

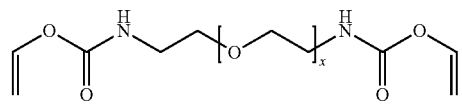

wherein x is from 0 to 10.

In one embodiment, the one or more di-carbamate-containing crosslinking agents include diethylene glycol bis(N-vinylcarbamate), diethylene glycol bis(O-allylcarbamate), and the like and mixtures thereof.

In one embodiment, the one or more second crosslinking agents are selected from the group consisting of diethylene glycol bis(N-vinylcarbamate), diethylene glycol bis(N-allylcarbamate), diethylene glycol bis(O-vinylcarbamate), diethylene glycol bis(O-allylcarbamate), and mixtures thereof, 1,4-butanediol bis(N-vinylcarbamate), ethylene glycol bis(O-vinyl carbonate), diethylene glycol bis(O-vinyl carbonate), 1,4-butanediol bis(O-vinyl carbonate) and mixtures thereof.

In one embodiment, the one or more second crosslinking agents containing at least two ethylenically unsaturated reactive end groups include at least one allyl-containing reactive end group and at least one (meth)acrylate-containing reactive end group. In one embodiment, the one or more second crosslinking agents include allyl methacrylate end groups.

In one embodiment, the one or more second crosslinking agents containing at least two ethylenically unsaturated reactive end groups can be represented by the structure of Formula V:

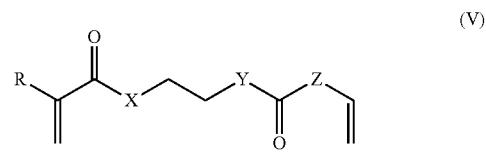

wherein R is hydrogen or methyl; and X, Y and Z are independently O or NH. Representative examples of suitable crosslinkers of formula V include those having the following structures:

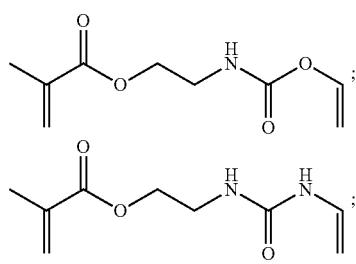

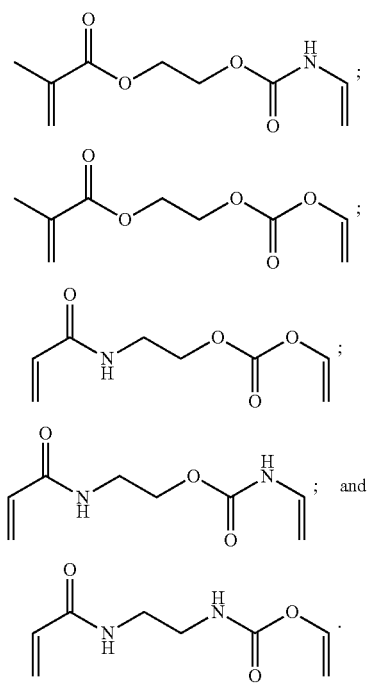

In one embodiment, the one or more second crosslinking agents containing at least two ethylenically unsaturated reactive end groups can be represented by the structure of Formula VI:

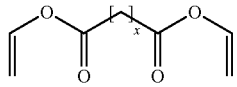

(VI)

wherein R is hydrogen or methyl; X is O; Y is O or NH; Z is NH; W is O and n is from 2 to 6. Representative examples of suitable crosslinkers of formula VI include those having the following structures:

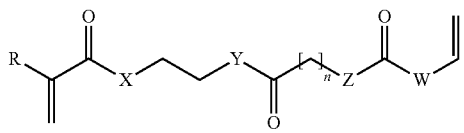

In one embodiment, the one or more second crosslinking agents containing at least two ethylenically unsaturated reactive end groups can be represented by the structure of Formula VII:

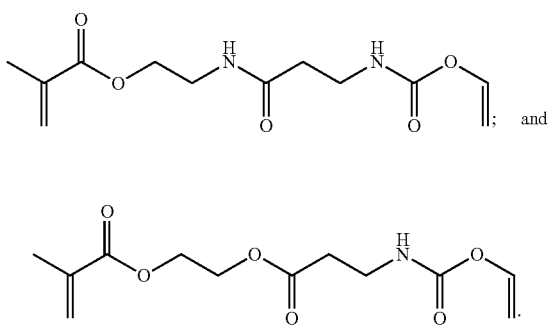

(VII)

wherein x is from 2 to 10.

In general, the one or more first crosslinking agents are present in the monomeric mixture in an amount of about 0.01 to about 2 wt. %, based on the total weight of the monomeric mixture, and the second crosslinking agent is present in the monomeric mixture in an amount of about 0.01 to about 3 wt. %, based on the total weight of the monomeric mixture.

If desired, the monomeric mixture can further include a minor amount of one or more additional hydrophilic monomers other than a cyclic lactam as discussed above. Suitable additional hydrophilic monomers include, for example, amides, hydroxyl-containing (meth)acrylates, poly(alkene glycols) functionalized with polymerizable groups and the like and mixtures thereof. Representative examples of amides include alkylamides such as N,N-dimethylacrylamide, N,N-dimethylmethacrylamide and the like and mixtures thereof. Representative examples of hydroxyl-containing (meth)acrylates include 2-hydroxyethyl methacrylate (HEMA), glycerol methacrylate and the like and mixtures thereof. Representative examples of functionalized poly(alkene glycols) include poly(diethylene glycols) of varying chain length containing monomethacrylate or dimethacrylate end caps. In one embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. Mixtures of the foregoing additional hydrophilic monomers can also be used in the monomeric mixtures herein. In one embodiment, the one or more additional hydrophilic monomers is HEMA.

In general, a minor amount of the one or more additional hydrophilic monomers is an amount of less than or equal to about 10 wt. %, e.g., an amount ranging from about 0.25 to about 10 wt. %, based on the total weight of the monomeric mixture.

The monomeric mixture can further include a diluent. Suitable diluents include, for example, at least one or more boric acid esters of a $C_1$ to $C_8$ monohydric alcohol, water-soluble or partly water-soluble monohydric alcohols and mixtures thereof. In one embodiment, a diluent includes, for example, at least one or more boric acid esters of a $C_1$ to $C_5$ monohydric alcohol. Suitable boric acid esters of a $C_1$ to $C_8$ monohydric alcohol include, for example, trimethyl borate, triethyl borate, tri-n-propyl borate, triisopropyl borate, tri-n-butyl borate, and tri-tert-butyl borate. Suitable water-soluble or partly water-soluble monohydric alcohols include, for example, monohydric alcohols having from 1 to 5 carbon atoms such as methanol, ethanol, isopropyl alcohol, 1-propanol, t-butyl alcohol, 2-butyl alcohol, 2-methyl-1-propanol, t-amyl alcohol and other $C_5$ isomers.

In one embodiment, the monomeric mixture contains about 5 wt. % to about 50 wt. % of the diluent, based on the total weight of the monomeric mixture. In one embodiment, the monomeric mixture contains about 15 wt. % to about 30 wt. % of the diluent, based on the total weight of the monomeric mixture.

The monomeric mixture can further include one or more hydrophobic monomers. Suitable hydrophobic monomers include, for example, ethylenically unsaturated hydrophobic monomers such as, for example, (meth)acrylates-containing hydrophobic monomers, N-alkyl (meth)acrylamides-containing hydrophobic monomers, alkyl vinylcarbonates-containing hydrophobic monomers, alkyl vinylcarbamates-containing hydrophobic monomers, fluoroalkyl (meth)acrylates-containing hydrophobic monomers, N-fluoroalkyl (meth)acrylamides-containing hydrophobic monomers, N-fluoroalkyl vinylcarbonates-containing hydrophobic monomers, N-fluoroalkyl vinylcarbamates-containing hydrophobic monomers, silicone-containing (meth)acrylates-containing hydrophobic monomers, (meth)acrylamides-containing hydrophobic monomers, vinyl carbonates-containing hydrophobic monomers, vinyl carbamates-containing hydrophobic monomers, styrenic-containing hydrophobic monomers, polyoxypropylene (meth)acrylate-containing hydrophobic monomers and the like and mixtures thereof.

In one illustrative embodiment, the one or more hydrophobic monomers is represented by the structure of Formula VIII:

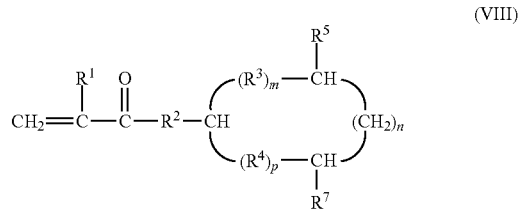

wherein $R^1$ is methyl or hydrogen; $R^2$ is —O— or —NH—; $R^3$ and $R^4$ are independently a divalent radical selected from the group consisting of —$CH_2$—, —CHOH— and —$CHR^6$—; $R^5$ and $R^6$ are independently a branched $C_3$-$C_8$ alkyl group; $R^7$ is hydrogen or —OH; n is an integer of at least 1, and m and p are independently 0 or an integer of at least 1, provided that the sum of m, p and n is 2, 3, 4 or 5.

Representative examples of one or more hydrophobic monomers represented by the structure of Formula VIII include, but are not limited to, 4-t-butyl-2-hydroxycyclohexyl methacrylate (TBE); 4-t-butyl-2-hydroxycyclopentyl methacrylate; 4-t-butyl-2-hydroxycyclohexyl methacrylamide (TBA); 6-isopentyl-3-hydroxycyclohexyl methacrylate; 2-isohexyl-5-hydroxycyclopentyl methacrylamide, 4-t-butylcyclohexyl methacrylate, isobornyl methacrylate, adamntyl methacrylate, n-butyl methacrylate, n-hexyl methacrylate, lauryl methacrylate, benzyl methacrylate, and the like. In one embodiment, one or more hydrophobic monomers (b) include compounds of formula I wherein $R^3$ is —$CH_2$—, m is 1 or 2, p is 0, and the sum of m and n is 3 or 4.

The one or more hydrophobic monomers can be present in the monomeric mixture in an amount ranging from about 0.5 wt. % to about 25 wt. %, based on the total weight of the monomeric mixture. In one embodiment, the one or more hydrophobic monomers can be present in the monomeric mixture in an amount ranging r from about 1 wt. % to about 10 wt. %, based on the total weight of the monomeric mixture.

In another illustrative embodiment, the monomeric mixture can further include one or more ultraviolet (UV) blockers. In one embodiment, useful UV blockers include one or more compounds of the following formulae:

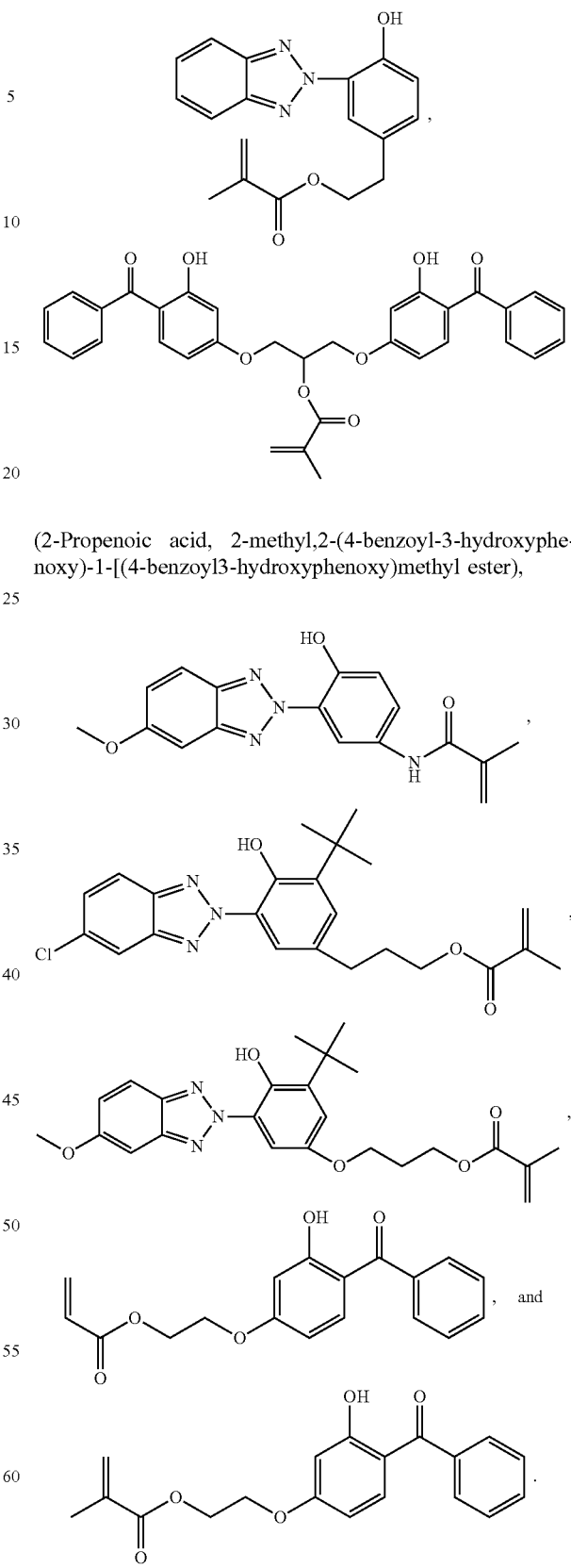

(2-Propenoic acid, 2-methyl,2-(4-benzoyl-3-hydroxyphenoxy)-1-[(4-benzoyl3-hydroxyphenoxy)methyl ester), The monomeric mixture may further contain, as necessary and within limits not to impair the purpose and effect of the present invention, various additives such as an antioxidant, coloring agent, lubricant, internal wetting agent, toughening agent and the like and other constituents as are well known in the art.

The ophthalmic devices of the illustrative embodiments, e.g., contact lenses or intraocular lenses, can be prepared by polymerizing the foregoing monomeric mixtures to form a product that can be subsequently formed into the appropriate shape by, for example, lathing, injection molding, compression molding, cutting and the like. For example, in producing contact lenses, the initial mixture may be polymerized in tubes to provide rod-shaped articles, which are then cut into buttons. The buttons may then be lathed into contact lenses.

Alternately, the ophthalmic devices such as contact lenses may be cast directly in molds, e.g., polypropylene molds, from the mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the mixtures to be polymerized to a mold, and spinning the mold in a controlled manner while exposing the mixture to a radiation source such as UV light. Static casting methods involve charging the monomeric mixture between two mold sections, one mold section shaped to form the anterior lens surface and the other mold section shaped to form the posterior lens surface, and curing the mixture while retained in the mold assembly to form a lens, for example, by free radical polymerization of the mixture. Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization may be facilitated by exposing the mixture to heat (thermal cure) and/or radiation, such as ultraviolet light, visible light, or high energy radiation. A polymerization initiator may be included in the mixture to facilitate the polymerization step. Representative examples of free radical thermal polymerization initiators include organic peroxides such as acetyl peroxide, lauroyl peroxide, decanoyl peroxide, stearoyl peroxide, benzoyl peroxide, tertiarybutyl peroxypivalate, peroxydicarbonate, and the like. Representative examples of diazo initiators include VAZO 64, and VAZO 67. Representative UV initiators are those known in the art and include benzoin methyl ether, benzoin ethyl ether, Darocure® 1173, 1164, 2273, 1116, 2959, 3331 (EM Industries) and Irgacure® 651 and 184 (Ciba-Geigy). Representative visible light initiators include IRGACURE 819 and other phosphine oxide-type initiators, and the like. Generally, the initiator will be employed in the monomeric mixture at a concentration of about 0.01 to about 5 wt. % of the total mixture.

Polymerization is generally performed in a reaction medium, such as, for example, a solution or dispersion using a solvent, e.g., water or an alkanol containing from 1 to 4 carbon atoms such as methanol, ethanol or propan-2-ol. Alternatively, a mixture of any of the above solvents may be used.

Generally, polymerization can be carried out for about 15 minutes to about 72 hours, and under an inert atmosphere of, for example, nitrogen or argon. If desired, the resulting polymerization product can be dried under vacuum, e.g., for about 5 to about 72 hours or left in an aqueous solution prior to use.

Polymerization of the mixtures will yield a polymer, that when hydrated, preferably forms a hydrogel. When producing a hydrogel lens, the mixture may further include at least a diluent as discussed above that is ultimately replaced with water when the polymerization product is hydrated to form a hydrogel. Generally, the water content of the hydrogel is as described hereinabove, i.e., at least about 50 wt. %. The amount of diluent used should be less than about 50 wt. % and in most cases, the diluent content will be less than about 30 wt. %. However, in a particular polymer system, the actual limit will be dictated by the solubility of the various monomers in the diluent. In order to produce an optically clear copolymer, it is important that a phase separation leading to visual opacity does not occur between the comonomers and the diluent, or the diluent and the final copolymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol; glycerine; liquid poly(ethylene glycol); alcohols; alcohol/water mixtures; ethylene oxide/propylene oxide block copolymers; low molecular weight linear poly(2-hydroxyethyl methacrylate); glycol esters of lactic acid; formamides; ketones; dialkylsulfoxides; butyl carbitol; borates as discussed herein and the like and mixtures thereof.

If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired, the mixture used to produce the hydrogel lens may further include crosslinking and wetting agents known in the prior art for making hydrogel materials.

In the case of intraocular lenses, the monomeric mixtures to be polymerized may further include a monomer for increasing the refractive index of the resultant polymerized product. Examples of such monomers include aromatic (meth) acrylates, such as phenyl (meth)acrylate, 2-phenylethyl (meth)acrylate, 2-phenoxyethyl methacrylate, and benzyl (meth)acrylate.

The ophthalmic devices such as contact lenses obtained herein may be subjected to optional machining operations. For example, the optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative. The examples should not be read as limiting the scope of the invention as defined in the claims.

Various polymerization products were formed as discussed below and characterized by standard testing procedures such as:

Oxygen permeability (also referred to as Dk) is determined by the following procedure. Other methods and/or instruments may be used as long as the oxygen permeability values obtained therefrom are equivalent to the described method. The oxygen permeability of silicone hydrogels is measured by the polarographic method (ANSI Z80.20-1998) using an O2 Permeometer Model 201T instrument (Createch, Albany, Calif. USA) having a probe comprising a central, circular gold cathode at its end and a silver anode insulated from the cathode. Measurements are taken only on pre-inspected pinhole-free, flat silicone hydrogel film samples of three different center thicknesses ranging from 150 to 600 microns. Center thickness measurements of the film samples may be measured using a Rehder ET-1 electronic thickness gauge. Generally, the film samples have the shape of a circular disk. Measurements are taken with the film sample and probe immersed in a bath comprising circulating phosphate buffered saline (PBS) equilibrated at 35° C.+/−0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample. For silicone hydrogel films, it is frequently useful to employ a Teflon polymer membrane, e.g., having a circular disk shape, between the probe cathode and the film sample. In such cases, the Teflon membrane is first placed on the premoistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value. At least two Dk measurements per thickness, and meeting R2 value, are obtained.

Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/−8.8% of the Repository values established by William J. Benjamin, et al., The Oxygen Permeability of Reference Materials, Optom Vis Sci 7 (12s): 95 (1997), the disclosure of which is incorporated herein in its entirety.

Water %: Two sets of six hydrated lenses or films are blotted dry on a piece of filter paper to remove excess water, and samples are weighed (wet weight). Samples are then placed in a microwave oven for 10 minutes inside a jar containing desiccant. The samples are then allowed to sit for 30 minutes to equilibrate to room temperature and reweighed (dry weight). The percent water is calculated from the wet and dry weights.

Contact Angle (CBCA): Captive bubble contact angle data was collected on a First Ten Angstroms FTA-1000 prop Shape Instrument. All samples were rinsed in HPLC grade water prior to analysis in order to remove components of the packaging solution from the sample surface. Prior to data collection the surface tension of the water used for all experiments was measured using the pendant drop method. In order for the water to qualify as appropriate for use, a surface tension value of 70-72 dynes/cm was expected. All lens samples were placed onto a curved sample holder and submerged into a quartz cell filled with HPLC grade water. Advancing and receding captive bubble contact angles were collected for each sample. The advancing contact angle is defined as the angle measured in water as the air bubble is retracting from the lens surface (water is advancing across the surface). All captive bubble data was collected using a high speed digital camera focused onto the sample/air bubble interface. The contact angle was calculated at the digital frame just prior to contact line movement across the sample/air bubble interface. The receding contact angle is defined as the angle measured in water as the air bubble is expanding across the sample surface (water is receding from the surface).

Modulus (g/mm$^2$) and % elongation were measured per ASTM 1708 employing an Instron (Model 4502) instrument where the film sample was immersed in borate buffered saline; an appropriate size of the film sample was gauge length 22 mm and width 4.75 mm, where the sample further has ends forming a dogbone shape to accommodate gripping of the sample with clamps of the Instron instrument, and a thickness of 100±50 microns.

Tensile strength (g/mm$^2$) was measured per ASTM test method D1708a.

Tear strength was measured according to ASTM D-1938 under the same physical conditions as for tensile modulus.

Sagittal depth (SAG) as measured on a Deltronic Comparator.

In the examples, the following abbreviations are used.

HEMA: 2-hydroxyethyl methacrylate.

NVP: N-vinyl-2-pyrrolidone.

AMA: Allyl methacrylate.

TRIS: tris(trimethylsiloxy)silylpropyl methacrylate.

SIGMA: (3-methacryloxy-2-hydroxy propoxy)propyl bis (trimethyl siloxy)methyl silane.

Tetraethylene glycol dimethacrylate (TEGDMA): a compound of the following structure:

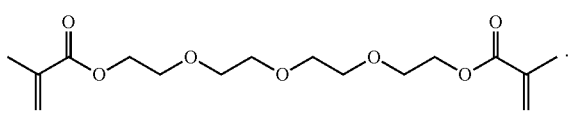 [SMILES: C=C(C)C(=O)OCCOCCOCCOCCOC(=O)C(=C)C]

Vazo™ 64: azo bis-isobutylnitrile (AIBN).
CIX-4: a compound having the structure:

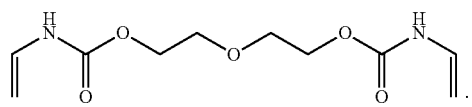 [SMILES: C=CNC(=O)OCCOCCOC(=O)NC=C]

SA monomer: a compound having the structure:

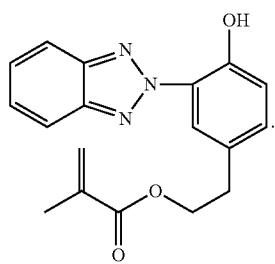 [SMILES: C=C(C)C(=O)OCCc1ccc(O)c(-n2nc3ccccc3n2)c1]

Hexamethylcyclotrisiloxane (D3) a compound having the structure:

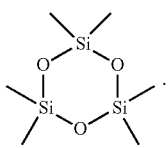

2,2,5,5-tetramethyl-2,5-disila-1-oxapentane (EDS) a compound having the structure:

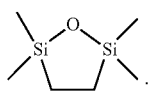

Examples 1-13

Preparation of a PDMS-EDS Monofunctional block copolymer having the following structure:

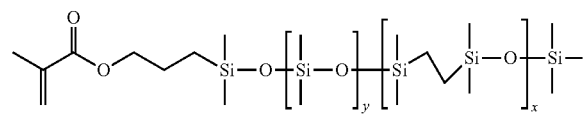

The x and y units obtained for each example are listed below in Table 1.

A 3-necked 500-mL Morton flask equipped with a stopper, a 60-mL addition funnel, a temperature probe, a reflux condenser and a magnetic stirring bar was charged with water (100 mL), sodium bicarbonate (6.9 g), and ethyl ether (100 mL). The flask was then placed in an ice/salt water bath (approx. 0° C.) and stirred vigorously. At ≤0° C., 3-methacryloxypropyldimethylchlorosilane (7.55 g) was added with 20-mL ether drop wise via addition funnel while stirring vigorously. The reaction mixture was then stirred for 1 hr, maintaining the temperature at ≤0° C. The mixture was poured into a plastic separatory funnel and the aqueous layer was separated. The organic layer was washed with 2×100 mL saturated bicarbonate solution. The organic layer was dried with 50:50 wt./wt. sodium sulfate/magnesium sulfate, filtered, collected in a plastic round bottom flask (RBF), and the solvent was removed under reduced pressure in a rotovap.

Once the structure and purity were confirmed by $^1$H-NMR, the material methacryloxypropyldimethylsilanol (5.28 g) was weighed into a RBF with 1,5,7-triazabicyclo[4.4.0]dec-5-ene (268 mg), 100-ml of toluene, and hexamethylcyclotrisiloxane (D3) (32.31-g). After stirring overnight, 2,2,5,5-tetramethyl-2,5-disila-1-oxapentane (EDS) (12.55 g) was added and the reaction stirred again overnight. Pyridine (5.8 mL) and trimethylchlorosilane (8.7 mL) were added directly to the reaction mixture, forming a white precipitate as the components reacted. After stirring for an additional four hours, the reaction was filtered and mixture washed with saturated bicarbonate solution. The organic layer was collected and dried with sodium sulfate, filtered, and solvent removed under reduced pressure in a rotovap. (Yield=64%). Examples 2-13 were carried out in substantially the same manner except the molar amounts of D3 and EDS were varied to change the x and y units obtained for each example as set forth below in Table 1.

TABLE 1

| Example | X units | Y units |
|---------|---------|---------|
| 1 | 1.54 | 14.3 |
| 2 | 2.43 | 20.1 |
| 3 | 2.63 | 19.4 |
| 4 | 1.95 | 10.5 |
| 5 | 1.5 | 6.24 |
| 6 | 1.84 | 3.55 |
| 7 | 0.5 | 9.3 |
| 8 | 1.32 | 15.4 |
| 9 | 1 | 13 |
| 10 | 1.45 | 1 |
| 11 | 1.4 | 12.57 |
| 12 | 0.56 | 4.76 |
| 13 | 0.825 | 6.8 |

Example 14

A monomeric mixture was made by mixing the following components, listed in Table 2 at amounts per weight.

TABLE 2

| Ingredient | Weight Percent |
|------------|----------------|
| PDMS-EDS Monofunctional of Example 9 | 21.5 |
| TRIS | 23.5 |
| NVP | 47.12 |
| HEMA | 7 |
| CIX-4 | 0.13 |
| TEGDMA | 0.75 |
| Monomer Mix (total) | 100.00 |
| Tri-t-butyl borate | 23 |

TABLE 2-continued

| Ingredient | Weight Percent |
|---|---|
| VAZO 64 | 0.5 |
| Tint | 0.02 |

The resultant monomeric mixture was cast into contact lenses by introducing the monomeric mixture to a polypropylene mold assembly. Then, the mold assembly and monomeric mixture were thermally cured for about 3 hours to form a contact lens. The resultant contact lenses were released from the mold assembly.

Examples 15-20

Preparation of a PDMS-EDS Monofunctional block copolymer having the following structure:

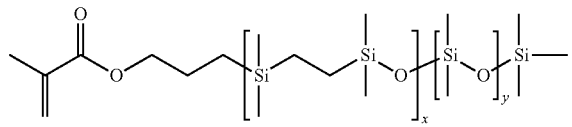

The x and y units obtained for each example are listed below in Table 3.

A 3-necked 500-mL Morton flask equipped with a stopper, a 60 mL addition funnel, a temperature probe, a reflux condenser and a magnetic stirring bar was charged with water (100 mL), sodium bicarbonate (6.9 g), and ethyl ether (100 mL). The flask was then placed in an ice/salt water bath (approx. 0° C.) and stirred vigorously. At ≤0° C., 3-methacryloxypropyldimethylchlorosilane (7.55 g) was added with 20-mL ether drop wise via addition funnel while stirring vigorously. The reaction mixture was then stirred for 1 hour, maintaining the temperature at ≤0° C. The mixture was poured into a plastic separatory funnel and the aqueous layer separated. The organic layer was washed with 2×100 mL saturated bicarbonate solution. The organic layer was dried with 50:50 wt./wt. sodium sulfate/magnesium sulfate, filtered, collected in a plastic RBF, and the solvent removed under reduced pressure in a rotovap.

Once structure and purity were confirmed by $^1$H-NMR, the material methacryloxypropyldimethylsilanol (5.28 g) was weighed into a RBF with 1,5,7-triazabicyclo[4.4.0]dec-5-ene (268 mg), 100-ml of toluene, and 2,2,5,5-tetramethyl-2,5-disila-1-oxapentane (EDS) (12.55 g). After stirring overnight, the other monomer hexamethylcyclotrisiloxane (D3) (32.31 g) was added and the reaction stirred again overnight. Pyridine (5.8-mL) and trimethylchlorosilane (8.7-mL) were added directly to the reaction mixture, forming a white precipitate as the components reacted. After stirring for an additional four hours, the reaction mixture was filtered and washed with saturated bicarbonate solution. The organic layer was collected and dried with sodium sulfate, filtered, and solvent removed under reduced pressure in a rotovap (Yield=64%). Examples 16-20 were carried out in substantially the same manner except the molar amounts of D3 and EDS were varied to change the x and y units obtained for each example as set forth below in Table 3.

TABLE 3

| Example | X units | Y units |
|---|---|---|
| 15 | 2.4 | 14 |
| 16 | 3.2 | 16.06 |
| 17 | 3.2 | 17.23 |
| 18 | 0.5 | 12 |
| 19 | 1.66 | 8.7 |
| 20 | 2.7 | 2.3 |

Example 21

Preparation of a PDMS-EDS Monofunctional block copolymer having the following structure:

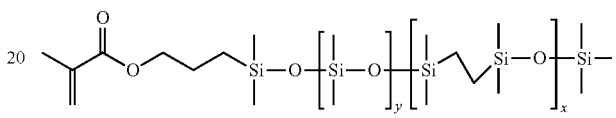

wherein x is 1.5 and y is 6.

A 3-necked 500-mL Morton flask equipped with a stopper, a 60-mL addition funnel, a temperature probe, a reflux condenser and a magnetic stirring bar was charged with water (100 mL), sodium bicarbonate (6.9 g), and ethyl ether (100 mL). The flask was then placed in an ice/salt water bath (approx. 0° C.) and stirred vigorously. At ≤0° C., 3-methacryloxypropyldimethylchlorosilane (7.55 g) was added with 20-mL ether drop wise via addition funnel while stirring vigorously. The reaction mixture was then stirred for 1 hr, maintaining the temperature at ≤0° C. The mixture was poured into a plastic separatory funnel and the aqueous layer separated. The organic layer was washed with 2×100 mL saturated bicarbonate solution. The organic layer was dried with 50:50 wt./wt. sodium sulfate/magnesium sulfate, filtered, collected in a plastic RBF, and the solvent removed under reduced pressure in a rotovap.

Once structure and purity were confirmed by $^1$H-NMR, the material methacryloxypropyldimethylsilanol (0.5 g, 2.47 mmol) in anhydrous THF (30 mL) was added to a 2-necked 100-mL flame-dried RBF fitted with a reflux condenser, a magnetic stirring bar, and a N$_2$ inlet. Subsequently, 12-crown-4 (0.56 g, 3.18 mmol) and lithium hydride (19.4 mg, 2.44 mmol) were added to the reaction flask and the nitrogen atmosphere was maintained throughout this step. The reaction flask was then placed in a preheated 45° C. oil bath and stirred vigorously overnight. The solution was filtered through 0.45 μm filter to remove residual salts, placed in jacketed flask, and cooled to 0° C. The monomer 2,2,5,5-tetramethyl-2,5-disila-1-oxapentane (0.59 g, 3.7 mmol) was added and the reaction stirred again overnight at 0° C. The next day the mixture was brought to room temperature and hexamethylcyclotrisiloxane (D3) was added (2.22-, 13.9 mmol), then stirred overnight. The subsequent day, trimethylchlorosilane (0.8 g, 7.5 mmol) was added dropwise via addition funnel and stirred for 3 hours. White precipitate was filtered off and 50-mL ethyl ether added to extract the product. The organic layer was washed with sodium bicarbonate solution, dried with sodium sulfate, filtered, and the solvent removed under reduced pressure in a rotovap.

Example 22

Preparation of a PDMS-EDS Monofunctional block copolymer having the following structure:

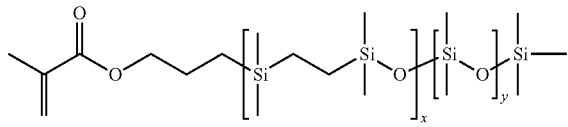

wherein x is 1.5 and y is 6.

A 3-necked 500 mL Morton flask equipped with a stopper, a 60 mL addition funnel, a temperature probe, a reflux condenser and a magnetic stirring bar was charged with water (100 mL), sodium bicarbonate (6.9 g), and ethyl ether (100 mL). The flask was then placed in an ice/salt water bath (approx. 0° C.) and stirred vigorously. At ≤0° C., 3-methacryloxypropyldimethylchlorosilane (7.55 g) was added with 20-mL ether drop wise via addition funnel while stirring vigorously. The reaction mixture was then stirred for 1 hr, maintaining the temperature at ≤0° C. The mixture was poured into a plastic separatory funnel and the aqueous layer was separated. The organic layer was washed with 2×100 mL saturated bicarbonate solution. The organic layer was dried with 50:50 wt./wt. sodium sulfate/magnesium sulfate, filtered, collected in a plastic RBF, and the solvent removed under reduced pressure in a rotovap.

Once structure and purity were confirmed by $^1$H-NMR, the material methacryloxypropyldimethylsilanol (0.5 g, 2.47 mmol) in anhydrous THF (30 mL) was added to a 2-necked 100-mL flame-dried RBF fitted with a reflux condenser, a magnetic stirring bar, and a $N_2$ inlet. Subsequently, 12-crown-4 (0.56 g, 3.18 mmol) and lithium hydride (19.4 mg, 2.44 mmol) were added to the reaction flask. It is important to maintain a nitrogen atmosphere throughout this step. The reaction flask was then placed in a preheated 45° C. oil bath and stirred vigorously overnight. The solution was filtered through 0.45 μm filter to remove residual salts, placed in jacketed flask, and cooled to 0° C. Hexamethylcyclotrisiloxane (D3) (2.22 g, 13.9 mmol) was added and the reaction stirred again overnight at 0° C. The next day the mixture was brought to room temperature and 2,2,5,5-tetramethyl-2,5-disila-1-oxapentane (0.594 g, 3.7 mmol) was added, and then stirred overnight. The subsequent day, trimethylchlorosilane (0.8 g, 7.5 mmol) was added dropwise via addition funnel and stirred for 3 hours. A white precipitate was filtered off and 50-mL ethyl ether added to extract the product. The organic layer was washed with sodium bicarbonate solution, dried with sodium sulfate, filtered, and the solvent removed under reduced pressure in a rotovap.

Examples 23-34

Preparation of a PDMS-EDS Monofunctional block copolymer having the following structure:

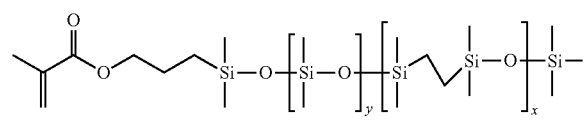

The x and y units obtained for each example are listed below in Table 4.

A two-neck round bottom flask and an addition funnel were dried in an oven and flame dried prior to use. Once the glassware cooled off, 2,2,5,5-tetramethyl-2,5-disila-1-oxapentane (15.2 g, 94.6 mmol), 40-mL cyclohexane, and 20-mL anhydrous THF were added to the flask and purged with $N_2$. Lithium trimethyl silanolate (1.11 g, 11.6 mmol) was then added and the reaction components stirred overnight at room temperature. The following day hexamethylcyclotrisiloxane (D3) (2.58 g, 11.6 mmol) was added and again stirred overnight at room temperature. The following day 10 mL of cyclohexane and sodium carbonate (10 mg, 0.09 mmol) were added to the flask and stirred for 30 minutes. 3-Methacryloxypropyldimethylchlorosilane (2.5 g, 11.4 mmol) was then added drop wise via addition funnel to the rapidly stirring flask. The reaction was stirred overnight at room temperature and the following day the product was filtered over celite and carbon black into a separatory funnel and washed with 100 mL of 10% aqueous solution of sodium bicarbonate and 100 mL of distilled water. The product was dried with ~50 wt % magnesium sulfate and sodium sulfate, filtered, and isolated under reduced pressure using a rotovap.

TABLE 4

| Example | X units | Y units |
|---|---|---|
| 23 | 2.2 | 12.5 |
| 24 | 3.3 | 14.6 |
| 25 | 2.4 | 14 |
| 26 | 1.26 | 0.5 |
| 27 | 1.1 | 0.5 |
| 28 | 0.8 | 6.6 |
| 29 | 1 | 8.2 |
| 30 | 6.9 | 2.35 |
| 31 | 7.5 | 9 |
| 32 | 1 | 15 |
| 33 | 3 | 15 |
| 34 | 6 | 11 |

Example 35

A monomeric mixture was made by mixing the following components, listed in Table 5 at amounts per weight.

TABLE 5

| Ingredient | Weight Percent |
|---|---|
| PDMS-EDS Monofunctional Of Example 34 | 19.5 |
| TRIS | 18.5 |
| NVP | 47.3 |
| HEMA | 12.5 |
| CIX-4 | 0.2 |
| TEGDMA | 1.6 |
| Monomer Mix (total) | 100.00 |
| Tri-t-butyl borate | 23 |
| VAZO 64 | 0.5 |
| Tint | 0.02 |

The resultant monomeric mixture was cast into contact lenses by introducing the monomeric mixture to a polypropylene mold assembly. Then, the mold assembly and monomeric mixture were thermally cured for about 3 hours to form a contact lens. The resultant contact lenses were released from the mold assembly.

Example 36

A monomeric mixture was made by mixing the following components, listed in Table 6 at amounts per weight.

TABLE 6

| Ingredient | Weight Percent |
|---|---|
| PDMS-EDS Monofunctional Of Example 33 | 21.5 |
| TRIS | 23.5 |
| NVP | 47.12 |
| HEMA | 7 |
| CIX-4 | 0.13 |
| TEGDMA | 0.75 |
| Monomer Mix (total) | 100.00 |
| Tri-t-butyl borate | 23 |
| VAZO 64 | 0.5 |
| Tint | 0.02 |

The resultant monomeric mixture was cast into contact lenses by introducing monomeric mixture to a polypropylene mold assembly. Then, the mold assembly and monomeric mixture were thermally cured for about 3 hours to form a contact lens. The resultant contact lenses were released from the mold assembly.

Example 37

A monomeric mixture was made by mixing the following components, listed in Table 7 at amounts per weight.

TABLE 7

| Ingredient | Weight Percent |
|---|---|
| PDMS-EDS Monofunctional Of Example 32 | 21.5 |
| TRIS | 23.5 |
| NVP | 47.12 |
| HEMA | 7 |
| CIX-4 | 0.13 |
| TEGDMA | 0.75 |
| Monomer Mix (total) | 100.00 |
| Tri-t-butyl borate | 23 |
| VAZO 64 | 0.5 |
| Tint | 0.02 |

The resultant monomeric mixture was cast into contact lenses by introducing the monomeric mixture to a polypropylene mold assembly. Then, the mold assembly and monomeric mixture were thermally cured for about 3 hours to form a contact lens. The resultant contact lenses were released from the mold assembly. The following properties were measured as set forth below in Table 8.

TABLE 8

| Example | Dk | Modulus | CBCA | Diameter | Sag | WC % |
|---|---|---|---|---|---|---|
| Example 36 | — | 58 | 43 | 14.654 | 4.104 | 53 |
| Example 37 | — | 76 | 41 | 14.533 | 4.000 | 52 |

Examples 38-44

Preparation of a PDMS-EDS Monofunctional block copolymer having the following structure:

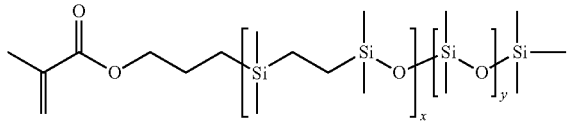

The x and y units obtained for each example are listed below in Table 9.

A two-neck round bottom flask and an addition funnel were dried in an oven and flame dried prior to use. Once the glassware cooled off, hexamethylcyclotrisiloxane (D3) (2.58 g, 11.6 mmol), 40 mL cyclohexane, and 20 mL anhydrous THF were added to the flask and purged with $N_2$. Lithium trimethyl silanolate (1.11 g, 11.6 mmol) was then added and the reaction components stirred overnight at room temperature. The following day 2,2,5,5-tetramethyl-2,5-disila-1-oxapentane (EDS) (15.2 g, 94.6 mmol) was added and again stirred overnight at room temperature. The following day 10 mL of cyclohexane and sodium carbonate (10 mg, 0.09 mmol) were added to the flask and stirred for 30 minutes. 3-Methacryloxypropyldimethylchlorosilane (2.5 g, 11.4 mmol) was then added drop wise via addition funnel to the rapidly stirring flask. The reaction was stirred overnight at room temperature and the following day the product was filtered over celite and carbon black into a separatory funnel and washed with 100 mL of 10% aqueous solution of sodium bicarbonate and 100 mL of distilled water. The product was dried with ~50 wt. % magnesium sulfate and sodium sulfate, filtered, and isolated under reduced pressure using a rotovap. Examples 39-44 were carried out in substantially the same manner except the molar amounts of D3 and EDS were varied to change the x and y units obtained for each example as set forth below in Table 9.

TABLE 9

| Example | X units | Y units |
|---|---|---|
| 38 | 1.5 | 11.9 |
| 39 | 3.3 | 15.25 |
| 40 | 3.5 | 15.8 |
| 41 | 2.08 | 10.2 |
| 42 | 7.5 | 6 |
| 43 | 3 | 18 |
| 44 | 6 | 10 |

Example 45

A monomeric mixture was made by mixing the following components, listed in Table 10 at amounts per weight.

TABLE 10

| Ingredient | Weight Percent |
|---|---|
| PDMS-EDS Monofunctional Of Example 43 | 21.5 |
| TRIS | 23.5 |
| NVP | 47.12 |
| HEMA | 7 |
| CIX-4 | 0.13 |

TABLE 10-continued

| Ingredient | Weight Percent |
|---|---|
| TEGDMA | 0.75 |
| Monomer Mix (total) | 100.00 |
| Tri-t-butyl borate | 23 |
| VAZO 64 | 0.5 |
| Tint | 0.02 |

The resultant monomeric mixture was cast into contact lenses by introducing the monomeric mixture to a polypropylene mold assembly. Then, the mold assembly and monomeric mixture were thermally cured for about 3 hours to form a contact lens. The resultant contact lenses were released from the mold assembly. The following properties were measured as set forth below in Table 11.

TABLE 11

| Example | Dk | Modulus | CBCA | Diameter | Sag | WC % |
|---|---|---|---|---|---|---|
| Example 45 | — | 129 | 39 | 13.814 | 4.071 | 48 |

It will be understood that various modifications may be made to the embodiments disclosed herein. Therefore, the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A water extractable ophthalmic device which is a polymerization product of a monomeric mixture comprising:
   (a) one or more cyclic lactams;
   (b) one or more organosilicon-containing block copolymers comprising one or more siloxanyl units and one or more silyl-alkyl-siloxanyl units, wherein the one or more organosilicon-containing block copolymers have an ethylenically unsaturated reactive end group;
   (c) one or more bulky siloxane monomers; and
   (d) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group;
   wherein the water extractable ophthalmic device has an equilibrium water content of at least 50 wt. %, a contact angle of less than 50°, and an oxygen permeability of at least 60 Barrers.

2. The water extractable ophthalmic device of claim 1, having an equilibrium water content of from about 50 wt. % to about 70 wt. %.

3. The water extractable ophthalmic device of claim 1, having an equilibrium water content of from about 50 wt. % to about 70 wt. %, a contact angle of from about 30° to about 50°, and an oxygen permeability of at least 70 Barrers.

4. The water extractable ophthalmic device of claim 1, having an equilibrium water content of from about 55 wt. % to about 65 wt. %, a contact angle of from about 30° to about 45°, and an oxygen permeability of at least 70 Barrers.

5. The water extractable ophthalmic device of claim 1, further having a water extractable content of less than 15 wt. %.

6. The water extractable ophthalmic device of claim 1, wherein an amount of the one or more cyclic lactams present in the monomeric mixture is no more than 55 wt. %, based on the total weight of the monomeric mixture.

7. The water extractable ophthalmic device of claim 1, wherein the one or more cyclic lactams are selected from the group consisting of N-vinyl-2-pyrrolidone, N-vinyl caprolactam, N-vinyl-2-piperidone and mixtures thereof.

8. The water extractable ophthalmic device of claim 1, wherein the one or more organosilicon-containing block copolymers comprise from about 3 to about 27 siloxanyl units and from about 1 to about 10 silyl-alkyl-siloxanyl units.

9. The water extractable ophthalmic device of claim 1, wherein the one or more organosilicon-containing block copolymers have a number average molecular weight ranging from about 500 Da to about 5,000 Da.

10. The water extractable ophthalmic device of claim 1, wherein the one or more organosilicon-containing block copolymers are represented by a structure of Formula I:

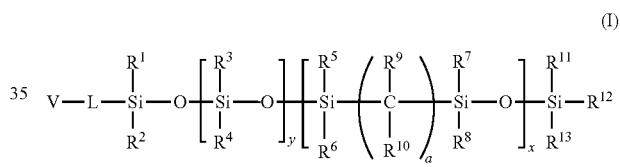

(I)

wherein V is an ethylenically unsaturated reactive end group, L is a linker group or a bond; $R^1$, $R^2$, $R^3$, $R^4$, $R^5$, $R^6$, $R^7$, and $R^8$ are independently hydrogen, $C_1$ to $C_{12}$ alkyl, halo alkyl, $C_3$ to $C_{12}$ cycloalkyl, heterocycloalkyl, $C_2$ to $C_{12}$ alkenyl, haloalkenyl, or $C_6$ to $C_{12}$ aromatic; $R^9$ and $R^{10}$ are independently hydrogen or $C_1$ to $C_{12}$ alkyl; $R^{11}$, $R^{12}$ and $R^{13}$ are independently a $C_1$ to $C_{12}$ alkyl, y is from 3 to 21, x is from 1 to 8, and a is from 0 to 4 or a structure of Formula II:

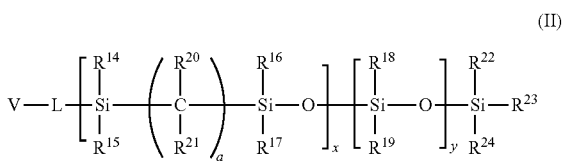

(II)

wherein V is an ethylenically unsaturated reactive end group, L is a linker group or a bond; $R^{14}$, $R^{15}$, $R^{16}$, $R^{17}$, $R^{18}$, and $R^{19}$ are independently hydrogen, $C_1$ to $C_{12}$ alkyl, halo alkyl, $C_3$ to $C_{12}$ cycloalkyl, heterocycloalkyl, $C_2$ to $C_{12}$ alkenyl, haloalkenyl, or $C_6$ to $C_{12}$ aromatic; $R^{20}$ and $R^{21}$ are independently hydrogen or $C_1$ to $C_{12}$ alkyl; $R^{22}$, $R^{23}$ and $R^{24}$ are independently a $C_1$ to $C_{12}$ alkyl, y is from 3 to 27, x is from 1 to 10 and a is from 2 to 4.

11. The water extractable ophthalmic device of claim 1, wherein the one or more bulky siloxane monomers are selected from the group consisting of a bulky polysiloxanylalkyl (meth)acrylic monomer, a bulky polysiloxanylalkyl carbamate monomer and mixtures thereof.

12. The water extractable ophthalmic device of claim 1, wherein the one or more bulky siloxane monomers are represented by a structure of Formula III:

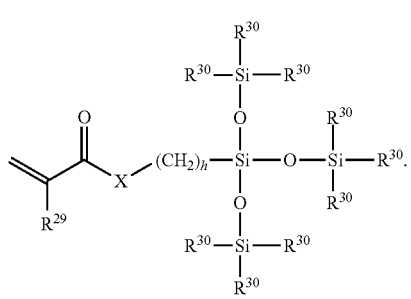
(III)

wherein X denotes —COO—, —CONR'—, —OCOO—, or —OCONR'—; wherein R' is hydrogen or a $C_1$-$C_4$ alkyl; $R^{29}$ independently denotes hydrogen or methyl; each $R^{30}$ independently denotes a lower alkyl radical, a phenyl radical or a group represented by

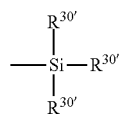

wherein each $R^{30'}$ independently denotes a lower alkyl radical, or a phenyl radical; and h is 1 to 10; or a structure of Formula IV:

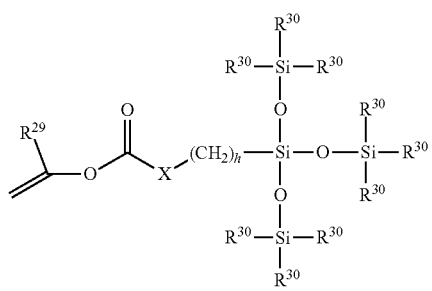
(IV)

wherein X denotes —NR"—; wherein R" denotes hydrogen or a $C_1$-$C_4$ alkyl; $R^{29}$ denotes hydrogen or methyl; each $R^{30}$ independently denotes a lower alkyl radical, a phenyl radical or a group represented by

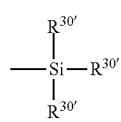

wherein each $R^{30'}$ independently denotes a lower alkyl radical, or a phenyl radical; and h is 1 to 10.

13. The water extractable ophthalmic device of claim 1, wherein the one or more first crosslinking agents are selected from the group consisting of an alkylene glycol-containing di(meth)acrylate crosslinking agent, an alkylene glycol-containing tri(meth)acrylate crosslinking agent, an alkylene glycol-containing tetra(meth)acrylate crosslinking agent and mixtures thereof.

14. The water extractable ophthalmic device of claim 1, wherein the one or more second crosslinking agents are selected from the group consisting of a di(N-vinylcarbamate)-containing crosslinking agent, a di(N-allylcarbamate)-containing crosslinking agent, a di(O-vinylcarbamate)-containing crosslinking agent, a di(O-allylcarbamate)-containing crosslinking agent, a di(O-vinylcarbonate)-containing crosslinking agent, a di(O-allylcarbonate)-containing crosslinking agent, a tri(N-vinylcarbamate)-containing crosslinking agent, a tri(N-allylcarbamate)-containing crosslinking agent, a tri(O-vinylcarbamate)-containing crosslinking agent, a tri(O-allylcarbamate)-containing crosslinking agent, a tri(O-vinylcarbonate)-containing crosslinking agent, a tri(O-allylcarbonate)-containing crosslinking agent, a tetra(N-vinylcarbamate)-containing crosslinking agent, a tetra (N-allylcarbamate)-containing crosslinking agent, a tetra(O-vinylcarbamate)-containing crosslinking agent, a tetra(O-allylcarbamate)-containing crosslinking agent, a tetra(O-vinylcarbonate)-containing crosslinking agent, a tetra(O-allylcarbonate)-containing crosslinking agent, isocyanurate-containing crosslinking agent and mixtures thereof.

15. The water extractable ophthalmic device of claim 1, wherein the one or more second crosslinking agents are represented by a structure of Formula V:

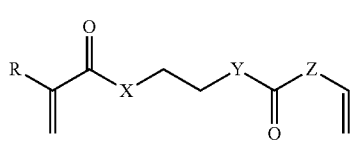
(V)

wherein R is hydrogen or methyl; and X, Y and Z are independently O or NH.

16. The water extractable ophthalmic device of claim 1, wherein the one or more second crosslinking agents are represented by a structure of Formula VI:

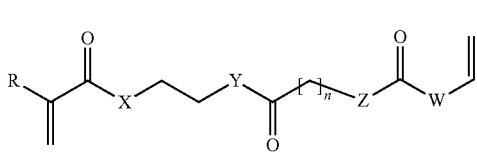
(VI)

wherein R is hydrogen or methyl; X is O; Y is O or NH; Z is NH; W is O and n is from 2 to 6.

17. The water extractable ophthalmic device of claim 1, wherein the one or more second crosslinking agents are represented by a structure of Formula VII:

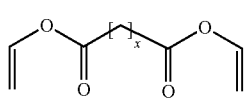
(VII)

wherein x is from 2 to 10.

18. The water extractable ophthalmic device of claim 1, wherein the monomeric mixture comprises:
(a) about 42 wt. % to about 55 wt. %, based on the total weight of the monomeric mixture, of the one or more cyclic lactams;
(b) about 5 to about 30 wt. %, based on the total weight of the monomeric mixture, of the one or more organosilicon-containing block copolymers;
(c) about 10 to about 45 wt. %, based on the total weight of the monomeric mixture, of the one or more bulky siloxane monomers; and
(d) the crosslinking agent mixture comprising (i) about 0.05 to about 2 wt. %, based on the total weight of the monomeric mixture, of the one or more first crosslinking agents and (ii) about 0.05 to about 2 wt. %, based on the total weight of the monomeric mixture, of the one or more second crosslinking agents.

19. The water extractable ophthalmic device of claim 1, wherein the monomeric mixture further comprises a minor amount of 2-hydroxyethyl methacrylate (HEMA).

20. The water extractable ophthalmic device of claim 1, wherein the monomeric mixture further comprises an ultraviolet (UV) blocker.

21. The water extractable ophthalmic device of claim 18, wherein the monomeric mixture further comprises a UV blocker.

22. The water extractable ophthalmic device of claim 1, wherein the monomeric mixture further comprises a diluent.

23. The water extractable ophthalmic device of claim 22, wherein the diluent comprises one or more boric acid esters of a $C_1$ to $C_8$ monohydric alcohol.

24. The water extractable ophthalmic device of claim 1, wherein the water extractable ophthalmic device is a contact lens.

25. The water extractable ophthalmic device of claim 1, wherein the water extractable ophthalmic device is a hydrogel.

26. A method of preparing a water extractable ophthalmic device, the method comprising:
(a) curing a monomeric mixture in a mold, the monomeric mixture comprising:
  (i) one or more cyclic lactams;
  (ii) one or more organosilicon-containing block copolymers comprising one or more siloxanyl units and one or more silyl-alkyl-siloxanyl units, wherein the one or more organosilicon-containing block copolymers have an ethylenically unsaturated reactive end group;
  (iii) one or more bulky siloxane monomers; and
  (iv) a crosslinking agent mixture comprising (1) one or more first crosslinking agents containing at least two ethylenically unsaturated reactive end groups, wherein the at least two ethylenically unsaturated reactive end groups are (meth)acrylate-containing reactive end groups and (2) one or more second crosslinking agents containing at least two ethylenically unsaturated reactive end groups wherein at least one of the ethylenically unsaturated reactive end groups is a non-(meth)acrylate reactive end group; and
(b) dry releasing the ophthalmic device from the mold to provide a water extractable ophthalmic device having an equilibrium water content of at least 50 wt. %, a contact angle of less than 50°, and an oxygen permeability of at least 60 Barrers.

27. The method of claim 26, wherein the water extractable ophthalmic device has an equilibrium water content of from about 50 wt. % to about 70 wt. %, a contact angle of from about 30° to about 50°, and an oxygen permeability of at least 70 Barrers.

28. The method of claim 26, wherein the water extractable ophthalmic device has an equilibrium water content of from about 55 wt. % to about 65 wt. %, a contact angle of from about 30° to about 45°, and an oxygen permeability of at least about 70 Barrers.

29. The method of claim 28, wherein the water extractable ophthalmic device further has a water extractable content of less than 15 wt. %.

30. The method of claim 26, wherein an amount of the one or more cyclic lactams present in the monomeric mixture is no more than 55 wt. %, based on the total weight of the monomeric mixture.

31. The method of claim 26, wherein the one or more cyclic lactams are selected from the group consisting of N-vinyl-2-pyrrolidone, N-vinyl caprolactam, N-vinyl-2-piperidone and mixtures thereof.

32. The method of claim 26, wherein the one or more organosilicon-containing block copolymers comprise from about 3 to about 27 siloxanyl units and from about 1 to about 10 silyl-alkyl-siloxanyl units.

33. The method of claim 26, wherein the one or more organosilicon-containing block copolymers have a number average molecular weight ranging from about 500 Da to about 5000 Da.

34. The method of claim 26, wherein the one or more organosilicon-containing block copolymers are represented by a structure of Formula I:

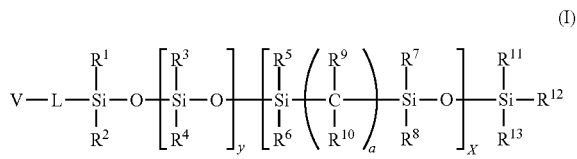

wherein V is an ethylenically unsaturated reactive end group, L is a linker group or a bond; $R^1$, $R^2$, $R^3$, $R^4$, $R^5$, $R^6$, $R^7$, and $R^8$ are independently hydrogen, $C_1$ to $C_{12}$ alkyl, halo alkyl, $C_3$ to $C_{12}$ cycloalkyl, heterocycloalkyl, $C_2$ to $C_{12}$ alkenyl, haloalkenyl, or $C_6$ to $C_{12}$ aromatic; $R^9$ and $R^{10}$ are independently hydrogen or $C_1$ to $C_{12}$ alkyl; $R^{11}$, $R^{12}$ and $R^{13}$ are independently a $C_1$ to $C_{12}$ alkyl, y is from 3 to 27, x is from 1 to 27 and a is from 2 to 4, or a structure of Formula II:

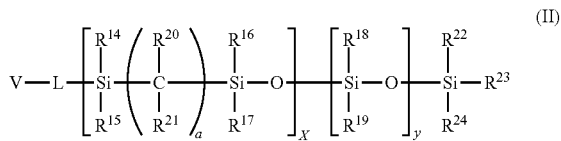

wherein V is an ethylenically unsaturated reactive end group, L is a linker group or a bond; $R^{14}$, $R^{15}$, $R^{16}$, $R^{17}$, $R^{18}$, and $R^{19}$ are independently hydrogen, $C_1$ to $C_{12}$ alkyl, halo alkyl, $C_3$ to $C_{12}$ cycloalkyl, heterocycloalkyl, $C_2$ to $C_{12}$ alkenyl, haloalkenyl, or $C_6$ to $C_{12}$ aromatic; $R^{20}$ and $R^{21}$ are independently hydrogen or $C_1$ to $C_{12}$ alkyl; $R^{22}$, $R^{23}$ and $R^{24}$ are independently a $C_1$ to $C_{12}$ alkyl, y is from 3 to 27, x is from 1 to 4 and a is from 2 to 4.

35. The method of claim 26, wherein the one or more bulky siloxane monomers are selected from the group consisting of a bulky polysiloxanylalkyl (meth)acrylic monomer, a bulky polysiloxanylalkyl carbamate monomer and mixtures thereof.

36. The method of claim 26, wherein the one or more bulky polysiloxane monomers are represented by a structure of Formula III:

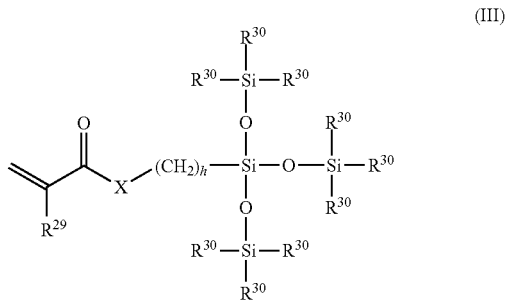

(III)

wherein X denotes —COO—, —CONR', 13 OCOO—, or —OCONR'—; wherein R' is hydrogen or a $C_1$-$C_4$ alkyl; $R^{29}$ independently denotes hydrogen or methyl; each $R^{30}$ independently denotes a lower alkyl radical, a phenyl radical or a group represented by

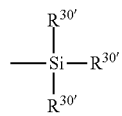

wherein each $R^{30'}$ independently denotes a lower alkyl radical, or a phenyl radical; and h is 1 to 10; or a structure of Formula IV:

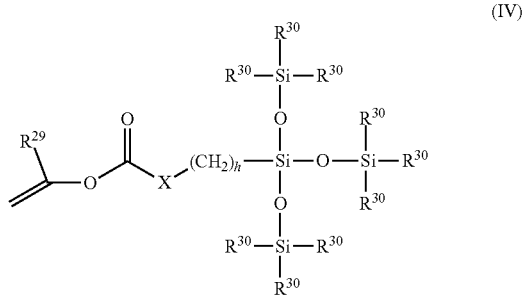

(IV)

wherein X denotes —NR"—; wherein R" denotes hydrogen or a $C_1$-$C_4$ alkyl; $R^{29}$ denotes hydrogen or methyl; each $R^{30}$ independently denotes a lower alkyl radical, a phenyl radical or a group represented by

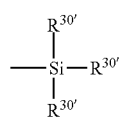

wherein each $R^{30'}$ independently denotes a lower alkyl radical, or a phenyl radical; and h is 1 to 10.

37. The method of claim 26, wherein the one or more first crosslinking agents are selected from the group consisting of an alkylene glycol-containing di(meth)acrylate crosslinking agent, an alkylene glycol-containing tri(meth)acrylate crosslinking agent, an alkylene glycol-containing tetra(meth)acrylate crosslinking agent and mixtures thereof.

38. The method of claim 26, wherein the one or more second crosslinking agents are selected from the group consisting of a di(N-vinylcarbamate)-containing crosslinking agent, a di(N-allylcarbamate)-containing crosslinking agent, a di(O-vinylcarbamate)-containing crosslinking agent, a di(O-allylcarbamate)-containing crosslinking agent, a di(O-vinylcarbonate)-containing crosslinking agent, a di(O-allylcarbonate)-containing crosslinking agent, a tri(N-vinylcarbamate)-containing crosslinking agent, a tri(N-allylcarbamate)-containing crosslinking agent, a tri(O-vinylcarbamate)-containing crosslinking agent, a tri(O-allylcarbamate)-containing crosslinking agent, a tri(O-vinylcarbonate)-containing crosslinking agent, a tri(O-allylcarbonate)-containing crosslinking agent, a tetra(N-vinylcarbamate)-containing crosslinking agent, a tetra(N-allylcarbamate)-containing crosslinking agent, a tetra(O-vinyl carbamate)-containing crosslinking agent, a tetra(O-allylcarbamate)-containing crosslinking agent, a tetra(O-vinylcarbonate)-containing crosslinking agent, a tetra(O-allylcarbonate)-containing crosslinking agent, isocyanurate-containing crosslinking agent and mixtures thereof.

39. The method of claim 26, wherein the one or more second crosslinking agents are represented by a structure of Formula V:

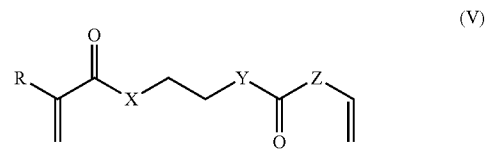

(V)

wherein R is hydrogen or methyl; and X, Y and Z are independently O or NH.

40. The method of claim 26, wherein the one or more second crosslinking agents are represented by a structure of Formula VI:

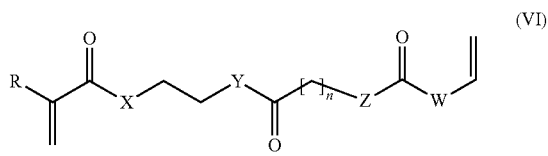

(VI)

wherein R is hydrogen or methyl; X is O; Y is O or NH; Z is NH; W is O and n is from 2 to 6.

41. The method of claim 26, wherein the one or more second crosslinking agents are represented by a structure of Formula VII:

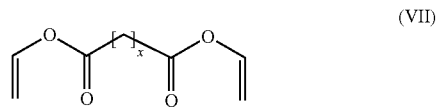

(VII)

wherein x is from 2 to 10.

42. The method of claim 26, wherein the monomeric mixture comprises:

(a) about 42 wt. % to about 55 wt. %, based on the total weight of the monomeric mixture, of the one or more cyclic lactams;
(b) about 5 to about 25 wt. %, based on the total weight of the monomeric mixture, of the one or more organo-silicon-containing block copolymers;
(c) about 10 to about 45 wt. %, based on the total weight of the monomeric mixture, of the one or more bulky siloxane monomers; and
(d) the crosslinking agent mixture comprising (i) about 0.05 to about 2 wt. %, based on the total weight of the monomeric mixture, of the one or more first crosslinking agents and (ii) about 0.05 to about 2 wt. %, based on the total weight of the monomeric mixture, of the one or more second crosslinking agents.

43. The method of claim 26, wherein the monomeric mixture further comprises a minor amount of HEMA.

44. The method of claim 26, wherein the monomeric mixture further comprises a UV blocker.

45. The method of claim 26, wherein the monomeric mixture further comprises a diluent.

46. The method of claim 45, wherein the diluent comprises one or more boric acid esters of a $C_1$ to $C_8$ monohydric alcohol.

47. The method of claim 26, wherein the water extractable ophthalmic device is a contact lens.

48. The method of claim 26, wherein the water extractable ophthalmic device is a hydrogel.

49. The method of claim 26, wherein the step of curing comprising one of thermal curing or infrared curing.

50. A water extractable ophthalmic device having an equilibrium water content of at least 50 wt. %, a contact angle of less than 50°, and an oxygen permeability of at least 60 Barrers, wherein the water extractable ophthalmic device is prepared by the method of claim 26.

* * * * *